J. VAIL.
Fruit-Gatherer.
No. 45,095. Patented Nov. 15, 1864.
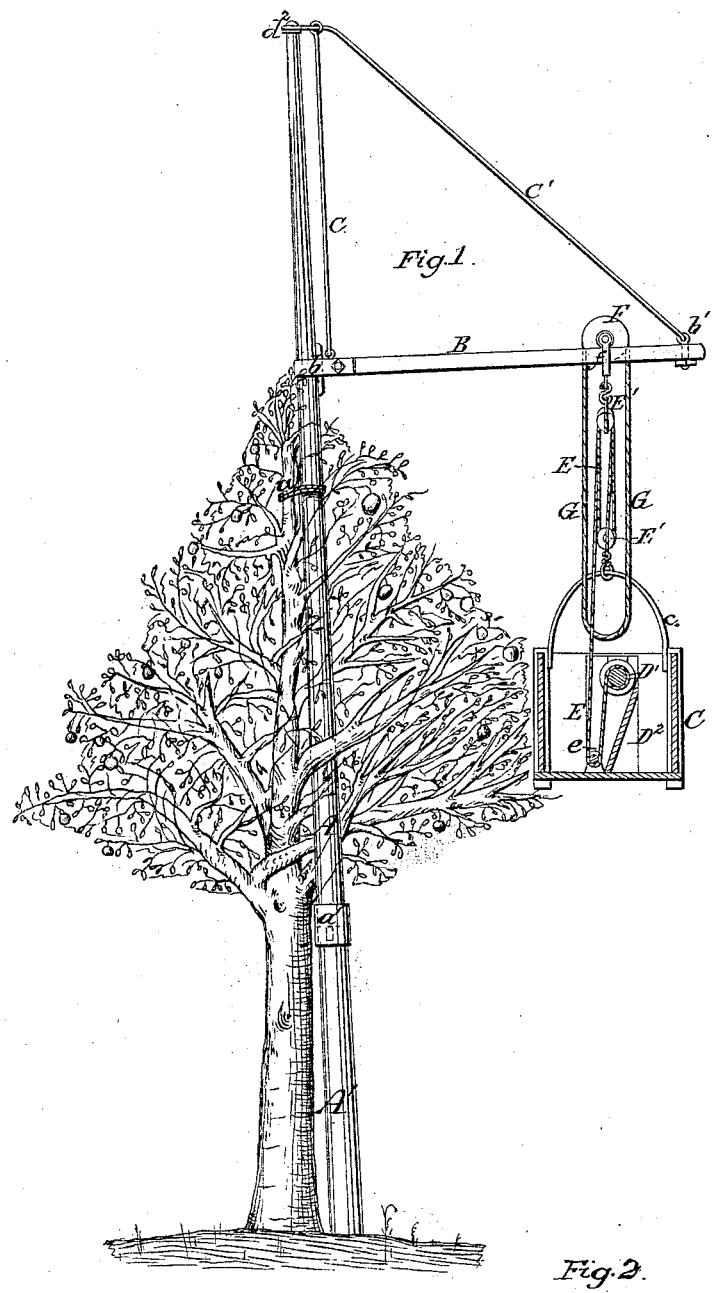
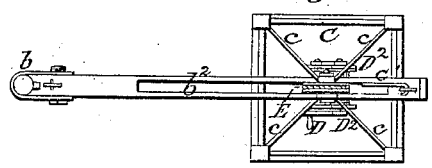
Witnesses:
C. D. Smith
J. Scheitlin
Inventor:
Jacob Vail

UNITED STATES PATENT OFFICE.

JACOB VAIL, OF NEWFIELD, NEW YORK.

IMPROVEMENT IN FRUIT-GATHERERS.

Specification forming part of Letters Patent No. 45,095, dated November 15, 1864.

*To all whom it may concern:*

Be it known that I, JACOB VAIL, of Newfield, in the county of Tompkins and State of New York, have invented a new and Improved Device for Gathering Fruit; and I do hereby declare the following to be a full and exact description of the same, reference being had to the accompanying drawings, making part of this specification, in which—

Figure 1 is an elevation of my improved apparatus in use, the view being made partly in section. Fig. 2 is a plan.

Similar letters of reference indicate corresponding parts in the figures.

This invention consists in the employment of a box in connection with a high standard or pole, a suspending-beam, blocks, cords, pulleys, and crank, the four devices last named enabling a person within the box to elevate himself within convenient reach of the fruit, and after plucking the same from one part of the tree and depositing it in the box he may shift his position either vertically or horizontally, and thus strip the entire tree, as will be hereinafter fully explained.

In order that others skilled in the art to which my invention appertains may be enabled to fully understand and use the same, I will proceed to describe its construction and operation.

In the drawings, the red lines may represent the tree from which the fruit is to be plucked.

A A' is a rigid standard or pole, the end of which is inserted into the ground at the bottom of the tree, and which is securely retained in the position shown in Fig. 1 by a band or strap, $a$, which encircles the pole and the trunk of the tree. The pole is formed in two parts, A A', respectively, joined together at the socket $a'$, and is thus constructed to facilitate its erection, and of the parts A' being employed alone in connection with low trees, for which purposes the two parts of the poles are adapted to be disconnected.

B is a beam, which is attached to the pole by means of a socket, $b$, fitting over said pole, and brace-rods C C', the rods C' hooking over a projection, $a^2$, on the top of the pole, and the two together serving to sustain the beams and the weight which is appended thereto.

The rod C' is made fast to the outer end of the beam B by means of an eyebolt, $b'$.

C is a box, large enough to permit a person to stand within and operate the crank D, and constitutes a depository for the fruit, which is received by the box as fast as picked. The crank D rotates a windlass, D', upon which may be wound or unwound a cord or tackle, E, which also works over pulley-blocks E' E' and a pulley, $e$, at the bottom of the box C. The pulley-blocks E' E' are attached respectively to the bails $c$ of the box C and to a bracket, $f$, in which latter is journaled a pulley, F, which traverses a slot, $b^2$, in the beam B. The windlass D' is journaled in standards D², which occupy a central position within the box C.

G is a cord, whereby the pulley F may be caused to approach or recede from the trunk of the tree. The fruit-picker operates the cord from within the box C while the latter is in a state of suspension, and as the upper point of suspension, $f$, of the box C is varied with the movement of the pulley F, the box undergoes a corresponding change in position. The fruit-picker thus has ready access to the fruit which may be located between the trunk or center of the tree and the exterior thereof.

The operation of the apparatus will be readily understood from the foregoing description. The fruit-picker gets into the box while it is upon the ground, and by turning the crank elevates himself, with the box, to the lower branches of the tree. The socket $b$, as well as the rod C', permits the beam B to turn upon the pole in a horizontal plane, so that the person within the box C has only to grasp the branches of the tree to move the box around from one position to another. When the fruit has been plucked from the lower branches of the tree, the crank is turned, and the box ascends to a higher point. Thus the box is elevated and moved around the tree until it is stripped or the desired quantity of fruit is obtained, the crank D being reversed at intervals in order to lower the box and remove the fruit therefrom.

Having thus described my invention, the following is what I claim as new therein and desire to secure by Letters Patent:

1. The employment of the box C, elevated in the manner described, and suspended from the beam B $b$ so as to be turned about the central pole or standard, A, in the manner and for the purpose explained.

2. The pulley F, operated by the cord G and adapted to traverse the slot $b^2$, to move the box C toward or away from the center of the tree, as and for the purpose set forth.

3. In combination with the box C, for gathering fruit, the arrangement of the block and tackle E E′, windlass D′, crank D, and pulley $e$, substantially as described.

JACOB VAIL.

Witnesses:
C. D. SMITH,
R. N. EAGLE.